L. P. AYRES & S. F. JOHNSON.
FRICTION TRANSMISSION MECHANISM.
APPLICATION FILED APR. 27, 1914.

1,256,425.

Patented Feb. 12, 1918.

WITNESSES:
A. H. Edgerton
O. M. McLaughlin

INVENTOR
Levi P. Ayres - and
Solomon F. Johnson.
BY
V. H. Lockwood
ATTORNEY

UNITED STATES PATENT OFFICE.

LEVI P. AYRES AND SOLOMON F. JOHNSON, OF INDIANAPOLIS, INDIANA, ASSIGNORS TO HENDRICKS NOVELTY COMPANY, OF INDIANAPOLIS, INDIANA, A CORPORATION.

FRICTION TRANSMISSION MECHANISM.

1,256,425.

Specification of Letters Patent.  Patented Feb. 12, 1918.

Application filed April 27, 1914. Serial No. 834,680.

*To all whom it may concern:*

Be it known that we, LEVI P. AYRES and SOLOMON F. JOHNSON, citizens of the United States, and residents of Indianapolis, county of Marion, and State of Indiana, have invented a certain new and useful Friction Transmission Mechanism; and we do hereby declare that the following is a full, clear, and exact description thereof, reference being had to the accompanying drawings, in which like numerals refer to like parts.

The object of this invention is to improve the mounting of mechanism carrying a driven shaft and pulley in relation to a drive wheel, like the fly wheel of an engine, which frictionally engages the driven wheel or pulley so as to automatically hold the driven wheel in frictional engagement with the drive wheel.

The chief feature of the invention consists in yieldingly mounting the mechanism carrying the driven shaft and wheel, so that the same will rock sufficiently to accommodate itself to the irregularities of the driving wheel, but still hold the driven wheel in constant frictional engagement therewith by a spring tending to rock the mechanism carrying the driven shaft and wheel.

Figure 1:
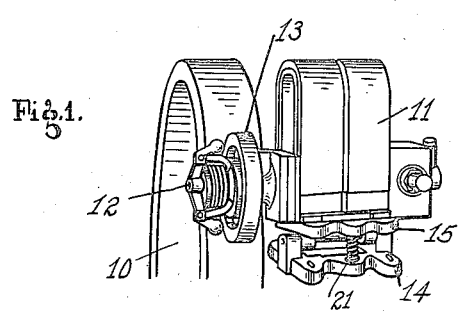
Figure 2:
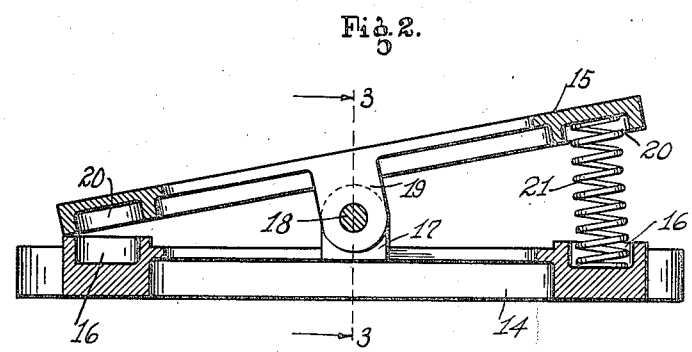
Figure 3:
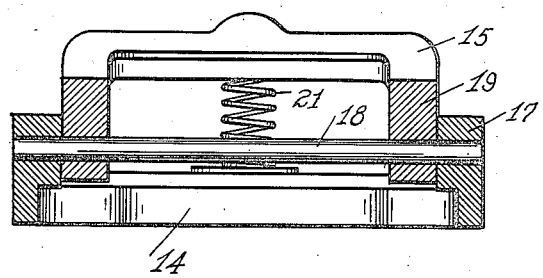

The nature of the invention will be understood from the accompanying drawings and the following description and claim:

In the drawings, Figure 1 is a perspective view of a magneto and a portion of the fly wheel of an engine. Fig. 2 is a central vertical section through the stationary base and the rocking base of the magneto, with the parts in idle position. Fig. 3 is a section on the line 3—3 of Fig. 2.

There is shown in the drawings herein a drive wheel 10, which may be the fly wheel of an engine or any other wheel to which power is imparted. The magneto 11 has an armature shaft 12 extending therethrough parallel with the axis of the drive wheel 10, and on said armature shaft there is secured a driven wheel or pulley 13 adapted to frictionally engage and be driven by the driving wheel 10.

The magneto has a stationary base 14 and a rocking base 15, as shown in Fig. 2. The stationary base is secured on some permanent structure near the drive wheel 10, and it has at its opposite ends a pair of sockets 16, and also, there is at each side an upwardly extending bearing arm 17, through which a rod 18 extends. The rocking base 15 is rigidly secured to the underside of the magneto, and it has at each side a downwardly extending bearing arm 19, which is mounted on the rod 18 so that the base 15 may rock on the stationary base. Said rocking base 15 has at each end a socket 20 corresponding with the socket 16 in the stationary base, and a spiral spring 21 is mounted in said sockets at one end of the device, so as to push said end of the rocking frame upward and correspondingly tilt or rock the magneto toward the drive wheel to press the driven wheel 13 in frictional engagement with the drive wheel. Said spring is used only at one end of the bases, preferably at the end farthest from the drive wheel.

In use, the stationary base is mounted so that the rocking base 15 will be substantially horizontal; that is, the spring 21 will be compressed by the magneto being set so that the drive wheel will force the driven wheel over and thus rock and hold the magneto in a substantially horizontal position. After such mounting, the springs 21 will constantly hold the wheel 13 in engagement with the wheel 10 and yield according to the irregularities in their form and surfaces. As the driven wheel, or end wheel, wears, the springs 21 will accommodate the position of the magneto, so that the machine will operate satisfactorily after such wear. The rocking mounting of the magneto makes it very sensitive and accommodating to the irregularities and wear of the two wheels.

By having the two sets of sockets, one at each end of the base structure, the magneto can be mounted at either side of the drive wheel as the exigencies of the machinery may require.

The invention claimed is:

The combination with a driving wheel, a shaft having one end extending across the face of the driving wheel and a driven wheel on the end of the shaft over the face of the driving wheel, of a stationary base, a rocking base pivoted to said stationary base and carrying said shaft, a spring adapted to be positioned between one or the other of the ends of the bases, whereby when the spring is between one end of the bases the shaft and driven wheel will be moved laterally in one direction and moved in the opposite direction when the spring is placed between the opposite ends of the bases and the driven wheel yieldingly held against the driving wheel, said bases having registering sockets at their ends for the reception of the ends of the spring.

In witness whereof, we have hereunto affixed our signatures in the presence of the witnesses herein named.

LEVI P. AYRES.
SOLOMON F. JOHNSON.

Witnesses:
J. H. WELLS,
R. G. LOCKWOOD.